(12) United States Patent
Kolokowsky et al.

(10) Patent No.: US 7,162,565 B1
(45) Date of Patent: Jan. 9, 2007

(54) UNIVERSAL SERIAL BUS INTERFACE TO MASS STORAGE DEVICE

(75) Inventors: Stephen Henry Kolokowsky, San Diego, CA (US); Mark McCoy, San Diego, CA (US)

(73) Assignee: Cypress Semiconductor Corp., San Jose, CA (US)

( * ) Notice: Subject to any disclaimer, the term of this patent is extended or adjusted under 35 U.S.C. 154(b) by 486 days.

(21) Appl. No.: 10/796,872

(22) Filed: Mar. 8, 2004

Related U.S. Application Data

(60) Provisional application No. 60/457,879, filed on Mar. 25, 2003.

(51) Int. Cl.
*G06F 13/00* (2006.01)

(52) U.S. Cl. .................. 710/313; 710/315; 710/62; 712/207

(58) Field of Classification Search ........ 710/305–315, 710/62–66; 712/207
See application file for complete search history.

(56) References Cited

U.S. PATENT DOCUMENTS

| | | | | |
|---|---|---|---|---|
| 5,828,854 | A * | 10/1998 | Wade | 710/315 |
| 6,199,122 | B1 * | 3/2001 | Kobayashi | 710/36 |
| 6,505,267 | B1 * | 1/2003 | Luke et al. | 710/315 |
| 6,618,788 | B1 * | 9/2003 | Jacobs | 710/315 |
| 7,010,638 | B1 * | 3/2006 | Deng et al. | 710/306 |
| 7,054,980 | B1 * | 5/2006 | Wurzburg | 710/305 |
| 7,073,010 | B1 * | 7/2006 | Chen et al. | 710/313 |

OTHER PUBLICATIONS

*Universal Serial Bus Mass Storage Class Specification Overview Revision 1.2* USB Implementers Forum Jun. 23, 2003 pp. 1-7.
*Universal Serial Bus Mass Storage Class Bulk-Only Transport Revision 1.0* USB Implementers Forum Sep. 31, 1999 pp. 1-22.
*Universal Serial Bus Mass Storage Class Control/Bulk/Interrupt Revision 1.0* USB Implementers Forum Dec. 14, 1998 pp. 1-26.
*CY4611—FX2 USB to ATA/CF Reference Design Notes* Cypress Semiconductor Corporation Nov. 2000-Jul. 2002 pp. 1-7.
*CY7C68013 EZ-USB® FX2™ USB Microcontroller High-Speed USB Peripheral Controller* Cypress Semiconductor Corporation Jun. 21, 2002 pp. 1-50.
*Advanced Technology Attachment ATA-2* From: PC Guide.com Jan. 2003, pp. 1-14.
*ATA Short for Advanced Technology Attachment* From: Webopedia. com Jan. 2003 p. 1.

(Continued)

*Primary Examiner*—Christopher Shin
(74) *Attorney, Agent, or Firm*—Marger Johnson & McCollom, P.C.

(57) ABSTRACT

An improved bridge circuit for connecting a disk drive with an ATA interface to a computer via a USB bus. After the bridge receives the first data from the ATA interface, the bridge makes the assumption that the next read command will probably be for the next sequential data word and the interface issues a read command for the next sequential data word. After an accessing delay, the second data word is received by the bridge. When the bridge does in fact receive the next read command from the host, a check is made to see if the second read command is for the next sequential location from the first read command. If it is, the already fetched data is provided to the host without delay. If it is not, the process is handled as was the first read command.

23 Claims, 4 Drawing Sheets

OTHER PUBLICATIONS

*Serial ATA Interface on Client Systems* Tom Pratt, Dell Computer Corporation Jun. 2003 pp. 1-4.
*CY7C68300A Revision *B* Cypress Semiconductor Corporation pp. 4 and 11.
EZ-USB FX2 Technical Reference Manual Version 2.1 Cypress Semiconductor Corporation Copyright 2000, 2001 pp. 1-130.
*Universal Serial Bus Specification Revision 2.0* USB Implementers Forum Apr. 27, 2000 pp. Title pp. ii, 1-83 and 195-296.

* cited by examiner

UNIVERSAL SERIAL BUS INTERFACE TO MASS STORAGE DEVICE

RELATED APPLICATIONS

This application is a non-provisional application of provisional application Ser. No. 60/457,879 filed Mar. 25, 2003. Priority of application 60/457,879 is hereby claimed.

FIELD OF THE INVENTION

This invention relates to computer systems and more particularly to interface devices which connect storage devices to a computer system.

BACKGROUND OF THE INVENTION

An important aspect of any computer system is the interface between the computer and external devices. In many situations, the various units which work together to form a complete computer system, are manufactured by more than one company or organization. The definition of standard interfaces therefore has been an important activity of the computer industry. Many interfaces have been defined by various standards committees. Frequently these interfaces are in a relatively constant state of improvement.

Two of the important interfaces which have been defined by standards committees and which are in widespread use are:
1) The IDE/ATA interface: IDE stands for "Integrated Device Electronics" and ATA stands for "Advanced Technology attachment". This interface is often referred to as the ATA interface and the IDE/ATA interface will herein be referred to as the ATA interface.
2) The USB interface: USB stands for "Universal Serial Bus" and it is coming into widespread use.

The ATA interface is frequently used to connect mass storage devices such as hard disk drives and optical disk drives to personal computers. Several versions of the ATA interface have been defined. The latest is the ATA-7 standard which is also referred to as the Ultra-ATA/133 standard. The first several ATA standards specified a 40 pin ribbon cable with a 40 pin Insulation Displacement connector (IDC). The latest standard specifies an 80 pin ribbon cable with a 40 pin IDA connector. In this standard 40 pins in the cable are connected to ground. Many modern personal computer motherboards have built-in connectors for two of these cables and each cable can be attached to two peripheral devices. The ATA bus specifications is governed by the American National Standards Institute (ANSI) T13 and T10 working groups. The standards are published on the Internet and a link to them can be found on the web site of InterNational Committee for Information Technology Standards (INCITS) under the committee "T13 AT storage Interface" and "T10 SCSI Storage Interface".

The USB interface was designed to be an easy-to-use interface for personal computers. When a peripheral device is "plugged-in" to a personal computer using the USB interface, the computer will auto-detect and auto-configure the device. In most cases, no user intervention is required. This is a significant advance over the prior interfaces which in general required relatively difficult user intervention. The USB interface can be used with a wide variety of different types of peripheral devices. The USB interface therefore eliminates the need for multiple I/O standards and it simplifies PC connectivity. There have been a number of versions of the USB standard. The version presently being widely deployed is designated USB 2.0. The speed of USB 2.0 has been increased to 480 Mbits/second. This is a 40-x improvement overrr USB 1.0 and it makes USB 2.0 into an attractive interface for connecting mass storage devices, such as hard drives, to a personal computer. The USB interface is described in a document entitled "Universal Serial Bus Revision Specifications 2.0" which is publicly available on the web site of the "USB Implementers Forum" and elsewhere.

A bridge is a device which allows two interfaces to communicate with each other. A common commercially available bridge, is a bridge which interfaces a USB bus to an ATA bus. With a USB to ATA bridge, one can connect a mass storage device (such as a hard disk drive) which has a native ATA interface to a PC through an external USB bus.

The present invention provides an improved USB to ATA bridge which eliminates some of the delay inherent in the operation of prior art USB to ATA bridges. In the prior art USB-ATA bridge devices, there is a delay between the time that the host receives data and the time when the host issues the next read command. The present invention seeks to eliminate the effect of the above described delay upon the overall operation of the system.

SUMMARY OF THE PRESENT INVENTION

With the present invention the first read command is handled by the bridge in a normal manner. That is, the bridge receives the read command, after a processing delay, it passes this command to the ATA interface, and after an access delay data is received by the bridge. Finally after a buffering delay the first data packet is sent to the host. With the present invention, after the bridge completes the first read transaction requested by the host, the bridge makes the assumption that the next read command will probably be for the next sequential data location and the interface issues a speculative read command to the ATA interface to read from the next sequential data location. This is done before the host in fact issues the next read command. After an accessing delay, data requested by the speculative read command is received by the bridge. When the bridge does in fact receive the next read command from the host, a check is made to see if the second read command is for the next sequential location from the first read command. If it is, the already fetched data is provided to the host without delay. If it is not, the process is handled as was the first read command. Read commands subsequent to the second read command are handled in the same manner as was the second read command.

DETAILED DESCRIPTION OF PREFERRED EMBODIMENTS

Figure 1:
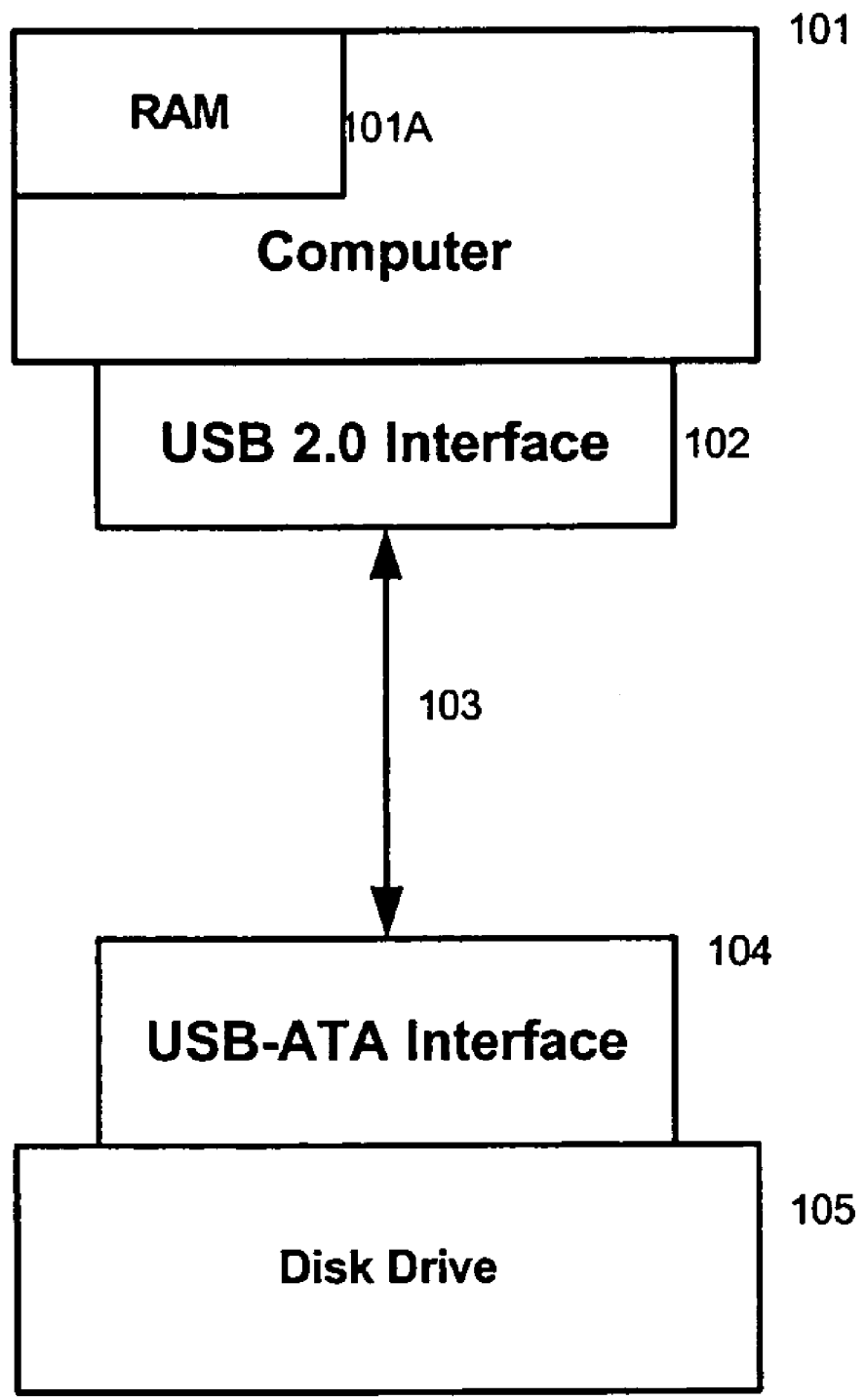
FIG. 1 is an overall block diagram of a first embodiment.

An overall block diagram of a first preferred embodiment of the invention is shown in FIG. 1. The purpose of the system shown in FIG. 1 is to connect a computer 101 to an external IDE/ATA hard disk drive 105 via a USB connection 103.

The computer 101 is a personal computer that includes a RAM memory 101A and a USB 2.0 Interface 102. Naturally, computer 101 may also includes the other components (not specifically shown in FIG. 1) that are normally part of a personal computer. For example, computer 101 may include a display, a keyboard, a mouse, and internal components such as a mother board, a processor, a bus, etc. The computer 101 could also be connected to a LAN or WAN as is usual.

Modern day personal computers typically include an internal hard disk drive (and computer 101 may include such a disk drive); however, recently it has been found desirable to provide computers with "external" hard disk drives that are connected to the main computer by a USB connection. Computer 101 has such an external hard disk drive 105.

Many personal computers include an ATA controller built into the motherboard. Thus, internal hard drives are connected to the computer bus by a cable from the ATA interface on the hard drive is to a ATA interface connector on the motherboard. Due to distance and other limitations, external hard drives such as drive 105 can not be directly connected to the ATA connector on the computer's motherboard. Instead, the external hard drive 105 is connected to the computer by USB connection 103. For reasons that will be explained in detail, a USB to ATA interface 104 is required.

Various different types of disk drives are commercially available. For example, what is often referred to as a hard disk drive (HDD) reads and writes hard disks, what is generally referred to as a magnetic disk drive reads magnetic disks these can be hard disks or floppy disks), and what is generally referred to as an optical drive reads optical disks. The disk drive 105 could be any of these types of disk drive.

Many of the commercially manufactured disk drives have an IDE/ATA interface. IDE stands for "Integrated Drive Electronics" An IDE disk drive integrates a controller on the disk drive itself. A controller on a disk drive locates memory locations on the physical disk and controls writing and reading to specific address on the disk. The IDE controller also provides an ATA interface through which the drive receives command and provides data to a host such as computer 101. Internal disk drives are typically connected to the computer by the ATA interface. External disk drives on the other hand are typically connected to the host by a USB connection such as connection 103.

Theoretically, an external disk drive could include a native USB interface. However, for economic and other reasons most presently marketed external disk drive such as disk drive 105 include a native IDE/ATA interface and a bridge or interface circuit 104 that converts the ATA interface to a USB interface.

There is a major difference between a USB interface and an ATA interface. A USB cable transmits information serially. An ATA interface is designed to receive command and to receive and send data via a parallel interface. The commands sent over the USB connection (in the embodiment described here) are SCSI commands, while an ATA interface uses a different command set often referred to as ATA or ATAPI.

A USB connection can handle four types of transfers:
1) Control
2) Interrupt (polled)
3) Bulk
4) Isochronous With the embodiment described here, only the "control" and "bulk" transfers are used. Devices connected to a host with a USB connection can exchange information at a range of nominal speeds up to 480 Mbps. The ability to operate at speeds to 480 Mbps was as introduced in version 2.0 of the USB specification, but a device does not have to work at 480 Mbps to meet USB 2.0 requirements. Interface 102 on computer 101 is a USB 2.0 interface.

A USB 2.0 connection can handle many different classes of devices. The USB standard defines class 8 devices as "mass storage" devices. Sub-class 8_6 specifies the use of SCSI commands, that is, sub-class 8_6 devices use a SCSI transparent command set. SCSI commands are defined by the SCSI standard. The commands sent to the USB-ATA interface 104 via connection 103 are SCSI commands; however, they are packaged as USB packets in accordance with the USB standard.

All transmissions on USB are host centric. That is, the host initiates all transactions. As with most modern protocols, the USB protocol has multiple layers. For the purpose of explaining the present invention we need focus on the third level of the protocol. At the third level of the protocol, commands from the host consist of SCSI commands encapsulated in USB packets. Thus a SCSI read command is sent from USB interface 102 to USB-ATA interface 104. The SCSI commands requests certain data from disk drive 105. Another read command is not issued by the host until the requested data (or some fault indication) is provided to the host by the USB-ATA interface 104. Thus, the operations is said to be "host centric" and as such, certain delays are introduced into the system. As will be described, the present embodiment minimizes the delays introduced into the operations of the system by virtue of the fact that the system operates in a host centric manner.

The preferred embodiment provides a method and system for providing a USB-ATA bridge that has increased speed and which eliminates some of the delays that are inherent in the prior art USB-ATA bridge circuits. Since USB transmissions are host centric, typically a device connected by a USB connection waits for the host to initiate an operation. With the embodiment described here, the USB-ATA bridge initiates "speculative" transactions without waiting for commands from the host. The speculative commands are what the bridge expects that the next command will be. A high percentage of the time, the speculative command is in fact the next command issued by the host. If that is the case, time is saved. If the speculative command is not what the host in fact issues, the result of the speculative command is discarded. In this case, nothing is gained, but there is no loss.

Figure 2:
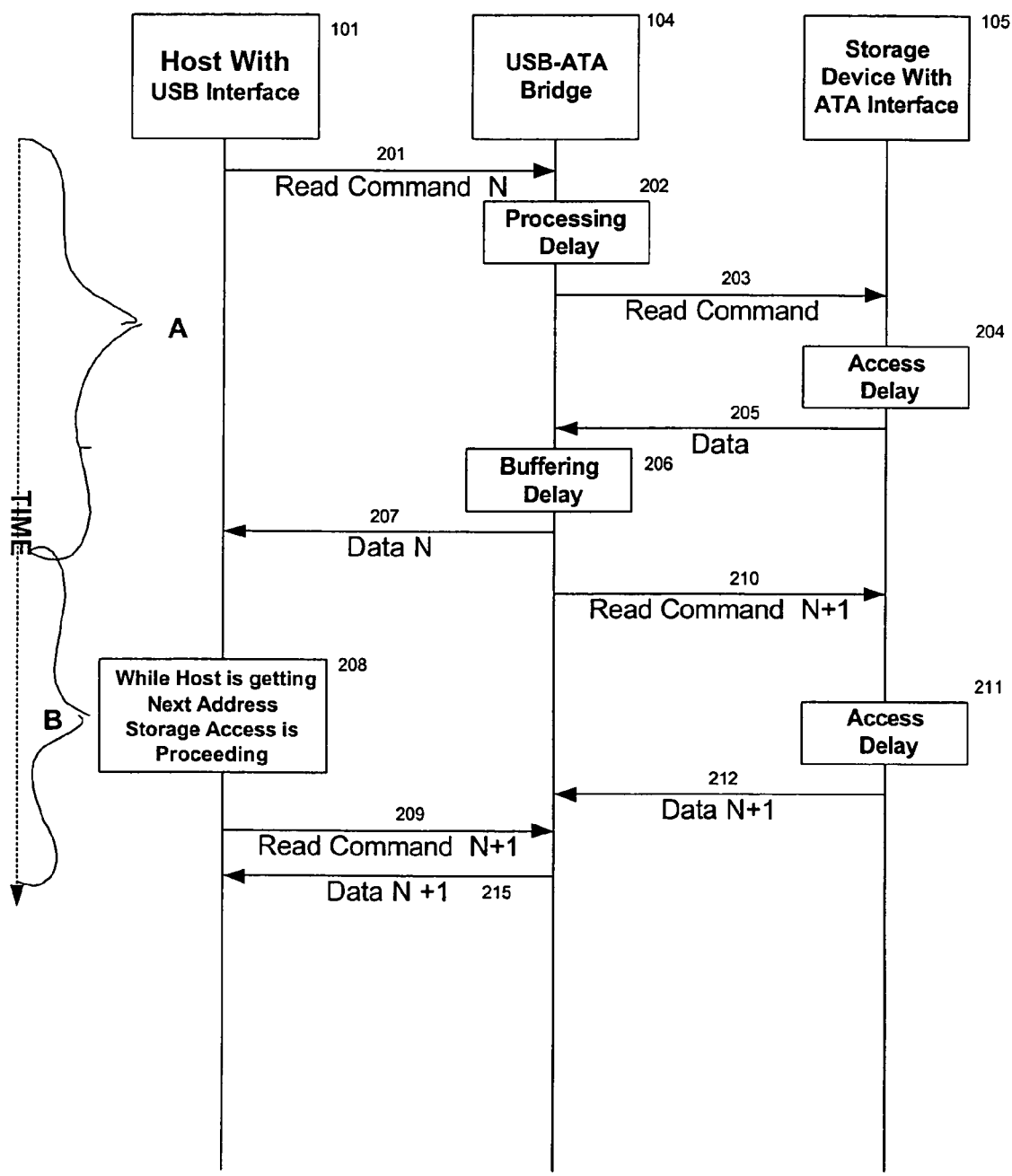
FIG. 2 is timing diagram showing the time relationship of various actions.

FIG. 2 is a timing diagram which shows in a time sequence the operations performed when host 101 sends a series of read commands to storage device 105. The operations shown in FIG. 2 are performed by host 101, USB-ATA bridge 104 and Storage device 105 The timing diagram is divided into two parts designated A and B. Part A illustrates the operations that occur when the first read command 201 is given and part B illustrates the operations that occur when commands subsequent to the first command are given. It should be understood that each SCSI encapsulated read command from the host 101 sent to interface 104 includes three parts. The first part is an operation code that indicates that data should be read from storage device 105, the second part of each read command is a field indicating the address from which data should be read, and the third part is a field indicating the amount of data that should be read.

After bridge circuit 104 receives the first read command (designated command N) there is a processing delay 202 during which the bridge circuit transforms this command into ATA read command 203 which is sent to the storage device 204. At the storage device 105, there is a delay 204 during which the storage device accesses the desired information. The information is then sent to the bridge 104 as indicated by the arrow 205. The bridge circuit 104 buffers this data (causing a delay 206) and then the data is sent to the host as indicated by the arrow 207.

Without waiting for any further commands from host 105, the bridge 104 sends another read command 210 to the storage device 105. Command 210 is a speculative read command that requests data from the address which is adjacent (or next in sequence) to the storage address specified by the previous read command. This speculative read command is issued based upon the fact that usually or most probably (but not definitely) sequential read commands read data from sequential memory addresses.

Since a speculative read command has been issued, while the host 101 is formulating the next read command, a data access operation at storage device 105 is proceeding. The data 212 retrieved by the speculative read command is sent to bridge 104 and it is buffered.

When the next read command 209 from host 101 arrives at bridge 104, the address in this command is compared to the address in the speculative read command 210. If they are the same, the data retrieved by the speculative read command is immediately sent to the host 101 as indicated by the arrow 215. If the address in read command 209 is not the same as the address in speculative read command 210 the data retrieved by read command 210 is discarded and a read command is issued to storage device 105 with the address in read command 209. Naturally, if the addresses do not match, no advantage was gained by the use of the speculative read command.

Figure 3:
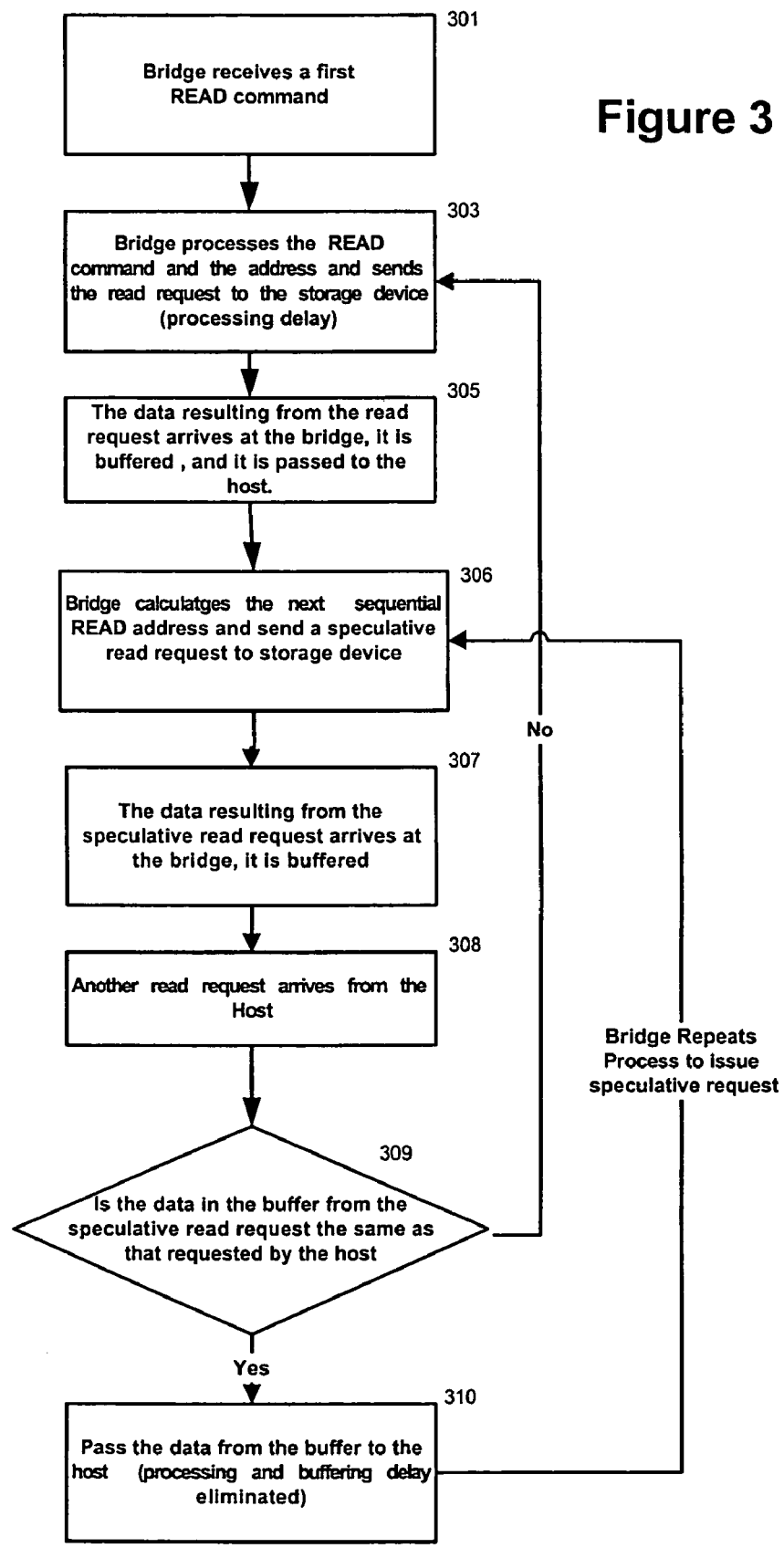
FIG. 3 is a block diagram which illustrates the operations of the system.

As will be explained later, in the embodiment described here, the operations in bridge 104 are controlled by a computer program. FIG. 3 is a block diagram of the computer program which performs the relevant operation in bridge 104. The operations begin as indicated by block 301 when the bridge 104 receives a read command from host 301. The command includes an operation code (OP code) that indicates that a read operation is requested and an address from which the data should be read. This command is transmitted to the bridge 104 via USB connection 103 and the command is in the format specified by the USB standard.

As indicated by block 303, the bridge processes this read command to transform its format into the format specified by the ATA standard and the command is sent to the storage device 105. The data arrives at the bridge 104 serially, according to the USB format and the bridge 104 transforms the data in a parallel ATA command. A certain amount of time is required for processing by bridge 104, thus, there is a delay (indicated as delay 202 in FIG. 2) between when the command is received from the host 101 and when a command is sent to the storage device 105. The exact amount of this delay is not particularly relevant and it is dependent upon the specific technology used to implement the bridge. The point of relevance is that irrespective of the particular technology used to implement the bridge, there is a processing delay at this point in the operation of the bridge.

As indicated by block 305, after an access delay 204, the storage device 105 provides data to the bridge. Next, there is a certain amount of buffering delay (as indicated by block 206 in FIG. 2) and then the data is sent to the host 101. After the data is sent to the host, the bridge 104 calculates and issues a speculative read command to storage device 105 as indicated by block 306. The speculative read command assumes that the next data that will be requested is the data which has the next higher address. In fact in high percentages of the situations this is true, because often data is stored in sequential data locations.

As indicated by block 307 and 308, the data from the speculative read request arrives from storage 105 and the another read request arrives from host 101. As indicated by block 309, the address of the speculative read request and the address from the read request from host 104 are compared. If they are the same (as they will be a large percentage of the time) the data retrieved by the speculative data request is sent to the host as indicated by block 310. Note that this occurs without having to wait for any accessing delay. If the addresses are different the system will have to incur an accessing delay before the data is available and the process returns to block 303.

Integrated circuits that provide a USB-ATA interface are commercially available. For example Cypress Semiconductor Corporation markets such an integrated circuit under the designation CY7C68013. A data sheet describing the CY7C68013 is publicly available. A reference design kit, designated the CY4611 and entitled "FX2 USB to ATA/CF Reference Design Notes" is also commercially available. Other manufacturers also have such USB-ATA bridge circuits commercially available.

Figure 4:
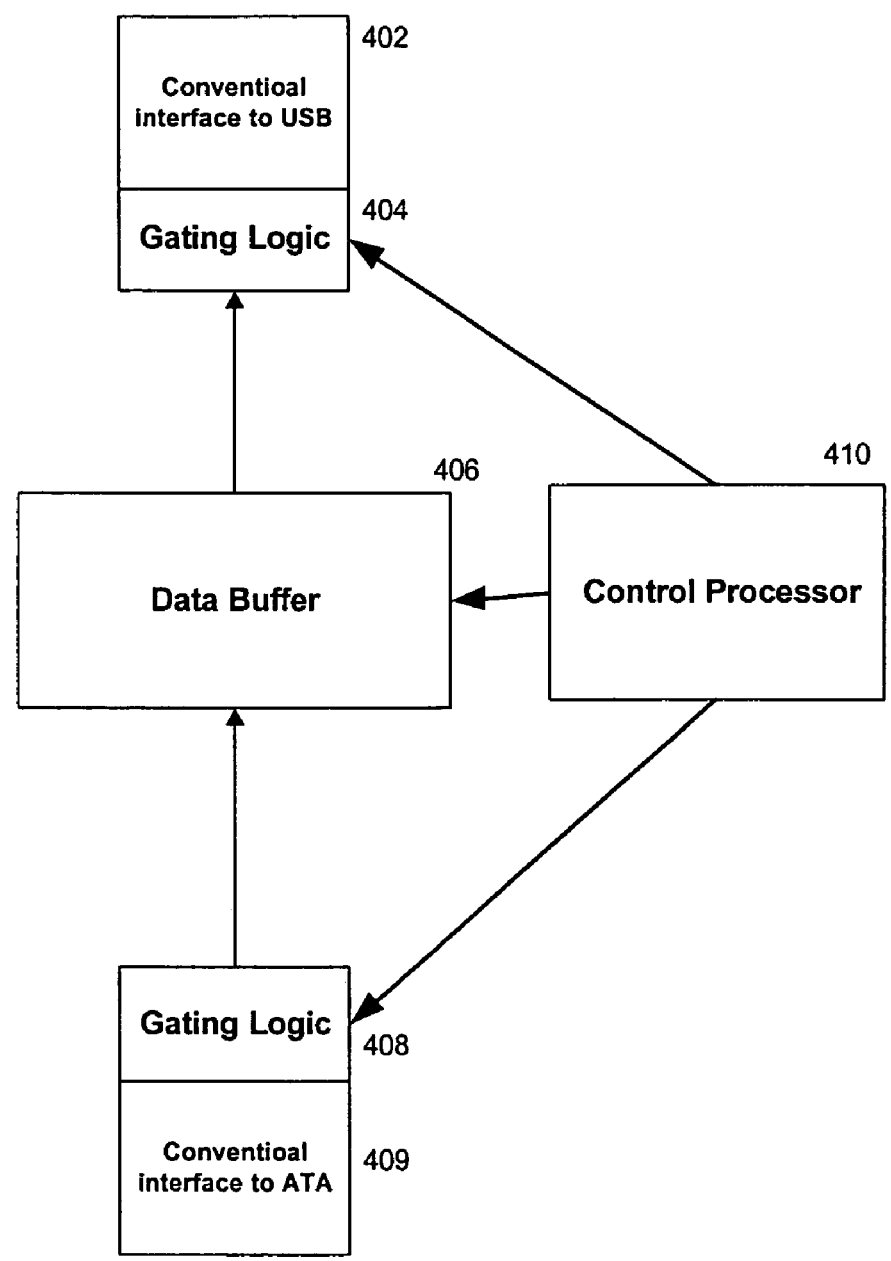
FIG. 4 is a block diagram of the bridge device.

FIG. 4 shows a general block diagram of the relevant parts of a USB to ATA bridge circuit. The system includes an interface 402 that receives information from a USB line that is in a USB format and it gates the information to buffer 406. Alternatively the interface takes information from the buffer 406, and packages it for transmission on the USB line. There is also an interface 409 that receives information from an ATA line that is in ATA format and it gates the information to buffer 406. Alternatively the interface takes information from the buffer 406, and packages it for transmission on the ATA lines. The entire operation is controlled by a programmable processor 410. That is, the operations shown in FIG. 3 are performed by a program running in control processor 410.

With the embodiment shown herein delays are eliminated or at least minimized by the generation of speculative read commands by the bridge circuit. These speculative read commands are generated by a program running in the control processor 410 shown in FIG. 4.

Thus, the present invention is directed to increasing the speed and eliminating the delay in such bridge circuits that connect a USB bus to an ATA bus. There are several versions of ATA in widespread use. The type ATA that this embodiment of the invention utilizes can be termed "Parallel ATA" to differentiate it from what is sometimes referred to as "Serial ATA".

A number of different ATA interfaces that have been defined by the Small Form Factor (SFF) Standards Committee. Each interface is designed so that it is backward compatible. The Types of ATA are:

1) ATA: which is sometimes referred to as IDE, supports one or two hard drives, a 16-bit interface and PIO modes 0, 1 and 2.
2) ATA-2: Supports faster PIO modes (3 and 4) and multiword DMA modes (1 and 2). Also supports logical block addressing (LBA) and block transfers. ATA-2 is sometimes called Fast ATA and Enhanced IDE (EIDE).
3) ATA-3: Minor revision to ATA-2.
4) Ultra-ATA: Also called Ultra-DMA, ATA-33, and DMA-33, supports multiword DMA mode 3 running at 33 MBps.
5) ATA/66: A version that doubles ATA's throughput to 66 MBps.
6) ATA/100: An updated version of ATA/66 that increases data transfer rates to 100 MBps.

7) ATA-7 (also referred to as the Ultra-ATA/133) An updated standard which increases the data transfer rate to 133 MBps.

The embodiment described here can operate with any of these types of ATA. However, since the object of the embodiment is to increase speed, it is most advantageously used with the slower speed protocols. There will be an advantage even with the highest speed protocol; however, percentage wise, the advantage will be smaller than with the slower speed protocols.

The sequence of events shown in FIG. 2 indicate that the data 212 retrieved as a result of the speculative read command 210, arrives at the USB-ATA bridge 104 prior to the time that the next read command 209 arrives at USB-ATA bridge 104. It is noted that this is merely a function of the speed of the disk drive 105 and the speed of processor 101. If the disk drive 105 is relatively slow and host processor 101 is relatively fast, the data 212 may arrive at the USB-ATA bridge 104 after the read command 209 arrives at the USB-ATA bridge 104. However, irrespective of the sequence at which command 209 and data 212 arrive at USB-ATA bridge 104, the important point is that speculative read command 210 is issued prior to the time that read command 209 arrives at the USB-ATA bridge 104. Thus, by issuing the speculative read command, a certain amount of delay will be eliminated if in fact the speculative read command asks for the same data as does read command 209. As indicated previously, in a high percentage of the situations, this will be the case, since a series of data read commands frequently request data from sequential data addresses.

It is noted that the embodiment described above relates to reading data from an external disk drive 105. Other embodiment of the invention involve reading data from other types of storage devices. It is noted that some storage devices, such as NFLASH devices, do not have an ATA interface.

Embodiments directed to such devices could be connected via a USB port using a bridge that issues speculative read commands as described above; however, the specifics of the speculative commands would conform to what is required by the particular device.

Another alternate embodiment operates as follows: The speculative read command generated by the bridge pre-loads registers in the ATA interface of the storage device; however, the speculative command is not executed until the next read command is received from the host and the address in the speculative command is found to be the same as the address in the speculative command. The ATA interface in a storage device includes an address register and a length register. With this alternate embodiment, the speculative command, merely pre-loads the address and length registers in the ATA interface of the storage device. The storage device is not instructed to actually execute the speculative read command and seek the data pre-loaded in the registers until the next read command is received from the host and it is determined that the address in the speculative read command and the address in the next read command from the host are identical. Naturally, if the addresses are not identical, the speculative read command is not executed and instead the address and the length registers are loaded with the information in the read command from the host.

It is also noted that the Microsoft® Windows® 2000 and Windows XP operating systems, as well as Windows Millennium Edition (Windows Me), contain native support for devices that are compliant with the Universal Serial Bus (USB) Mass Storage Class Specification. If the USB bus driver enumerates a mass-storage-class-compliant device on a computer running Windows, it automatically loads the USB storage port driver for that device. Thus computer 101 can be a computer running the windows operating system.

While the invention has been shown and described with respect to a plurality of alternate embodiments, it should be understood that various changes in form and detail may be made without departing from the spirit and scope of the invention.

We claim:

1. A method of operating a bridge which receives data read commands from a host via a USB connection and which issues read commands to a storage device, each of said read commands requesting data at a particular address, said method including,
   generating speculative read requests which request data from addresses that are sequential to the address specified in a previous read request,
   comparing the address in subsequent read request to the address in said speculative read request, and
   transmitting to the host the data retrieved in response to said speculative read request if said addresses are the same.

2. A method of operating a bridge device which receives data read commands from a host via a USB connection and which translates said read commands into commands in ATA format to a storage device, said method including two parts the first of which occur in response to the first read command which requests data at a first location and the second part of which occurs in response to read commands subsequent to said first command, each said subsequent commands requesting data at subsequent locations, said method including the steps of:
   a) translating said first read command into an ATA format command and transmitting said ATA read command to said storage device where said storage device retrieves the data at said first location and transmits said data to said bridge device,
   b) transmitting said data from said bridge to said host via said USB connection,
   c) generating and transmitting to said ATA interface and to said storage device a second read command requesting data at the next sequential location to said first location,
   d) receiving and storing the data retrieved from said next sequential location, and
   e) when the a subsequent read command is received from said host, comparing the address in said subsequent command to said next sequential location address, and transmitting the data received from said storage device in response said request for data from the next location, if the address in said subsequent read command is the same as said next sequential address.

3. The method recited in claim 1 wherein said USB connection operates in accordance with the USB 2.0 standard protocol.

4. The method recited in claim 2 wherein said USB connection operates in accordance with the USB 2.0 standard protocol.

5. The method recited in claim 1 wherein said storage device is a hard disk drive.

6. The method recited in claim 2 wherein said storage device is a hard disk drive.

7. The method recited in claim 1 wherein said host is a personal computer.

8. The method recited in claim 2 wherein said host is a personal computer.

9. A bridge which receives data read commands from a host via a USB connection and which issues read commands to a storage device, each of said read commands requesting data at a particular address, said bridge including, means for generating speculative read requests which request data from addresses that are sequential to the address specified in a previous read request, and means for comparing the address in subsequent read request to the address in said speculative read request, and transmitting to said host the data retrieved in response to said speculative read request if said addresses are the same.

10. A bridge device which receives data read commands from a host via a USB connection and which translates said read commands into commands in ATA format to a storage device, said bridge receiving a first read command which requests data at a first location and a subsequent commands requesting data at subsequent locations, said bridge including:

a) means for translating said first read command into an ATA format command and transmitting said ATA read command to said storage device where said storage device retrieves the data at said first location and transmits said data to said bridge device, b) means for transmitting said data from said bridge to said host via said USB connection, c) means for generating and transmitting to said ATA interface and to said storage device a second read command requesting data at the next sequential location to said first location, d) means for receiving and storing the data retrieved from said next sequential location, and e) means operable when the a subsequent read command is received from said host, for comparing the address in said subsequent command to said next sequential location address, and for transmitting the data received from said storage device in response said request for data from the next location, if the address in said subsequent read command is the same as said next sequential address.

11. The bridge recited in claim 9 wherein said USB connection operates in accordance with the USB 2.0 standard protocol.

12. The bridge recited in claim 10 wherein said USB connection operates in accordance with the USB 2.0 standard protocol.

13. The bridge recited in claim 9 wherein said storage device is a hard disk drive.

14. The bridge recited in claim 10 wherein said storage device is a hard disk drive.

15. The bridge recited in claim 9 wherein said host is a personal computer.

16. The bridge recited in claim 10 wherein said host is a personal computer.

17. A method of operating a bridge which connects a memory device to a host via a USB connection, said host being adapted to send a sequence of memory read commands to said bridge, said method including the following steps performed after data from a first read command is received from said memory device, a) generating a speculative read command to read data from the next sequential address to the address specified in the previous read command from the host, c) after a read command is received by said bridge from said host, comparing the address in said read command to said next sequential address used by the previous speculative read command, and d) if said addresses match, sending the data received by said speculative read command to said host.

18. The method recited in claim 17 wherein the data read by said speculative read command is discarded in the address in the next read command from the host does not match the address in said speculative read command.

19. The method recited in claim 17 wherein said USB connection operates in accordance with the USB 2.0 standard protocol.

20. The method recited in claim 17 wherein said storage device is a hard disk drive.

21. The method recited in claim 17 wherein said host is a personal computer.

22. The bridge recited in claim 9 wherein said storage device includes an address register and wherein said speculative read request pre-loads said address register and instructs said storage device to read data specified by the address register if the address loaded equals the address in said subsequent read command.

23. The bridge recited in claim 22 wherein said storage device includes a length register and said speculative read request also pre-loads said length register.

* * * * *